Figure 1:
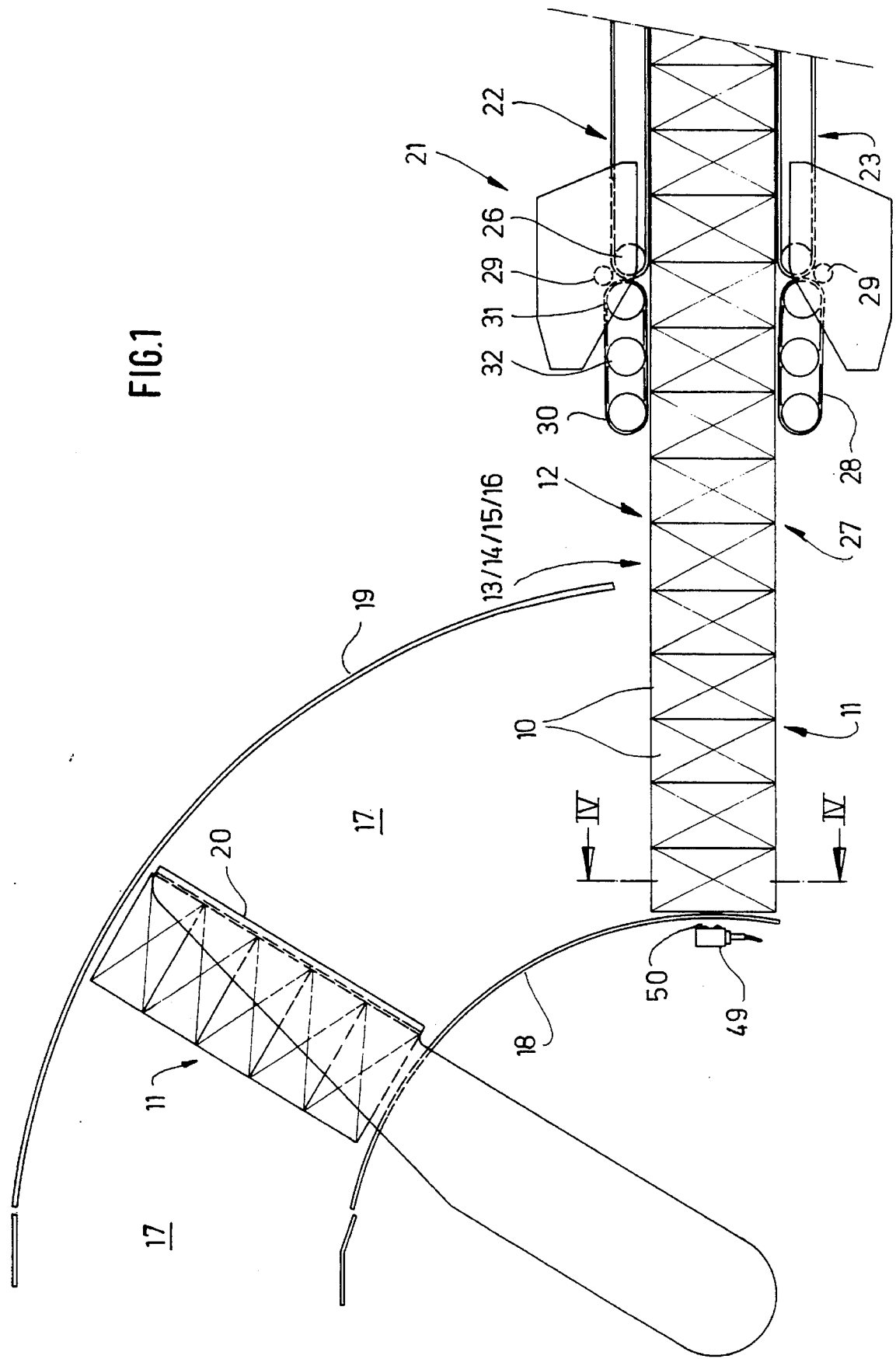

United States Patent [19]
Focke et al.

[11] Patent Number: 5,487,461
[45] Date of Patent: Jan. 30, 1996

[54] APPARATUS FOR TRANSPORTING PACKS

[75] Inventors: Heinz Focke; Oskar Balmer, both of Verden, Germany

[73] Assignee: Focke & Co. (GmbH & Co.), Verden, Germany

[21] Appl. No.: 43,485

[22] Filed: Apr. 6, 1993

[30] Foreign Application Priority Data

Apr. 7, 1992 [DE] Germany ............... 42 11 643.0
Aug. 1, 1992 [DE] Germany ............... 42 25 494.9

[51] Int. Cl.⁶ .................................................. B65G 15/50
[52] U.S. Cl. .......................... 198/571; 198/432; 198/606; 414/798.9
[58] Field of Search .......................... 53/152, 153, 497, 53/499, 531; 198/432, 433, 571, 606; 414/789.8, 798.9

[56] References Cited

U.S. PATENT DOCUMENTS

| | | | |
|---|---|---|---|
| 2,277,408 | 3/1942 | Molins et al. | 53/499 X |
| 2,920,737 | 1/1960 | Engleson et al. | |
| 3,455,085 | 7/1969 | McIntrye | 53/153 |
| 4,015,843 | 4/1977 | Tennant | 271/240 |
| 4,043,442 | 8/1977 | Greenwell et al. | 198/433 X |
| 4,680,919 | 7/1987 | Hirama et al. | 53/499 |

FOREIGN PATENT DOCUMENTS

| | | |
|---|---|---|
| 142619 | 1/1989 | European Pat. Off. . |
| 168548 | 4/1990 | European Pat. Off. . |
| 129431 | 1/1978 | Germany . |
| 3717146 | 12/1987 | Germany . |
| 3833390 | 5/1989 | Germany . |
| 3942708 | 6/1990 | Germany . |
| 4121978 | 2/1992 | Germany . |
| 435098 | 10/1967 | Switzerland . |
| 447008 | 3/1968 | Switzerland . |
| 1208444 | 10/1970 | United Kingdom . |

*Primary Examiner*—Michael S. Huppert
*Assistant Examiner*—Janice L. Krizek
*Attorney, Agent, or Firm*—Sughrue, Mion, Zinn, Macpeak & Seas

[57] ABSTRACT

Disclosed is a process and an apparatus for transporting pack rows. When a pack string (12) formed from several superposed rows (13, 14, 15, 16) of cuboid packs (10) is transported, it is required to compensate misalignments of the individual rows (13..16). A correct relative position is to be ensured in order to permit a transverse transfer of pack groups (11) formed from a portion of the pack string (12). A row which lies behind in the transport direction is conveyed further by an associated additional conveyor in the form of conveyor belts (28) until it reaches the correct relative position. The adjustment of the rows (13..16) is carried out at the end of a conveying cycle, when the pack string (12) runs up against a stop (guide 18). A row which lies behind is conveyed further by the conveyor belts (28) until it contacts the stop.

10 Claims, 4 Drawing Sheets

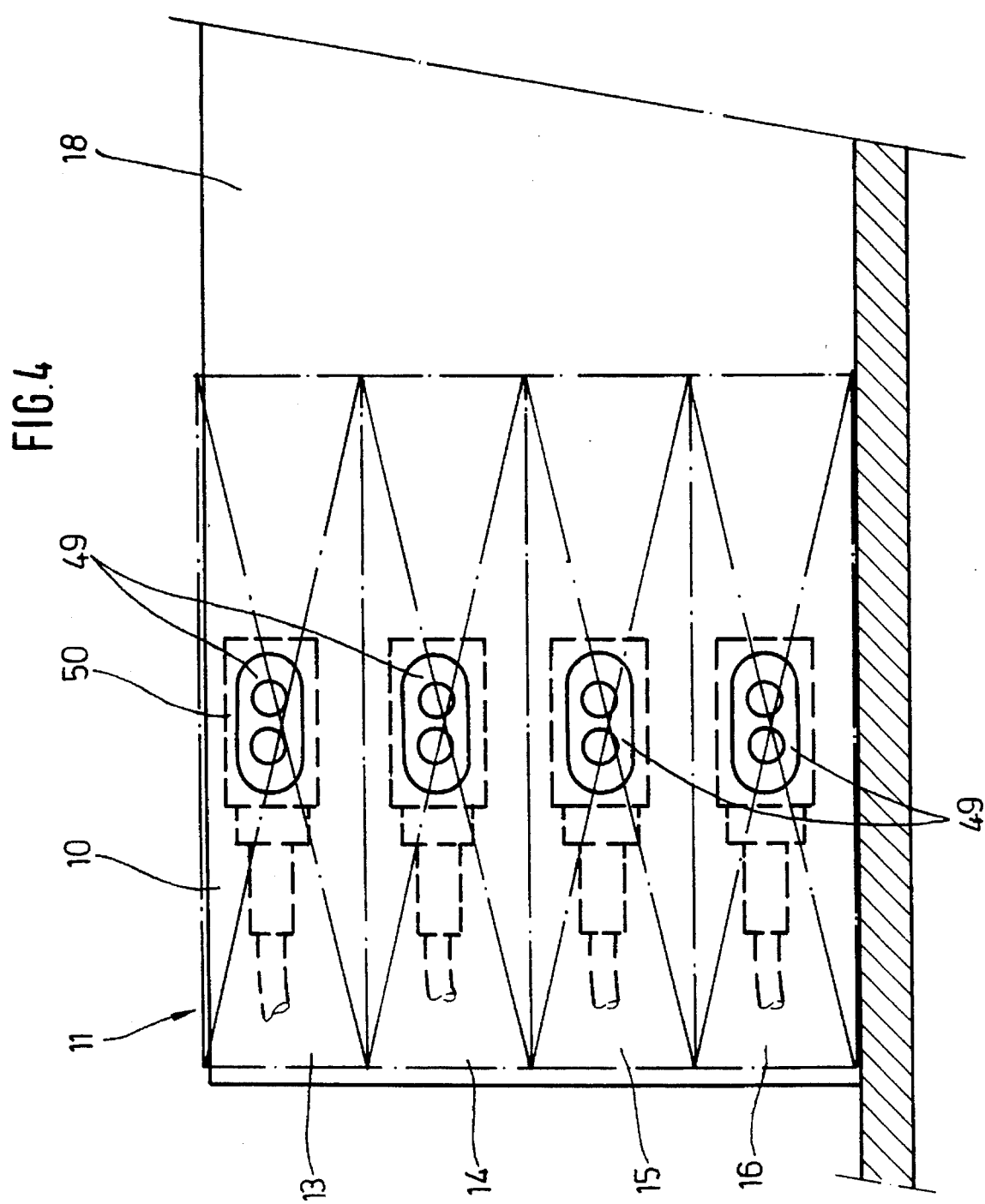

APPARATUS FOR TRANSPORTING PACKS

DESCRIPTION

The invention relates to a process for transporting a string of packs formed from several rows of packs disposed above or next to one another, in which the packs of the rows are in alignment relative to one another. Additionally, the invention relates to an apparatus for carrying out the process.

In the packaging art, it is required frequently and in different kinds of technological operations to transport a string of packs formed from several rows of packs of various types in a predetermined configuration. Especially when (approximately) block-shaped or cuboid packs are to be assembled into pack groups in order to form pack bundles, rows of packs are advanced continuously in the form of a pack string, The pack group which is assigned to a bundle is removed from the pack string by means of a transverse transport. In this process, it is particularly important that the rows which form the pack string are positioned such that their packs are not offset relative to one another.

In practical operation, however, there are different causes for the packs of one row to be displaced relative to the packs of another row during transport of a pack string.

It is the object of the invention to propose measures which ensure that the packs of the rows are in accurate alignment relative to one another during transport of a pack string or other ways of handling a pack string.

To attain this object, the process according to the invention is characterized in that the relative position of the packs of different rows is inspected and that, in the event of displacements of one row relative to another, a row which is behind in the conveying direction is transported relative to the other rows by means of an additional conveying movement until it is aligned with these other rows.

The pack string formed from several rows is transported continuously or intermittently in the form of a unit. If the packs of one row are offset relative to the packs of the other rows, an additional conveying drive is transmitted to the respective row which is behind in the transport direction until all packs are aligned. In particular, this is attained in such a way that the aligned rows, which are a head with respect to the transport direction, are transported against a stop and thus come to a standstill, whereas the row which is behind is transported further until it reaches the stop as well. In this position, a pack group which is a forward port ion of the pack string with respect to the transport direction can be discharged in the transverse direction in the form of a pack group of a bundle.

An apparatus according to the invention is equipped with side conveyors on both sides of a string of packs which is formed from superposed rows. Additionally, separate independently drivable conveying means are assigned to each row of packs in accordance with the invention. These conveying means act individually in response to an incorrect position detected by inspection means, in order to transmit an additional or continued drive to the respective row.

According to a preferred exemplary embodiment of the invention, the separate conveying means take the form of conveyor belts which are assigned to each row and which preferably act on opposite sides, in particular on side faces of the packs. According to a further feature of the invention, the conveying means or conveyor belts are arranged in the region of a transport path for the string of packs in such a way that they act outside the region of the side conveyors, in particular downstream of these side conveyors with respect to the transport direction. In the arrangement according to the invention, the string of packs has left the region of the side conveyors and is conveyed freely by the thrusting effect of the packs in an end portion of the transport path. According to the invention, this is where the conveyor belts act upon the packs.

The conveyor belts of each row contact the side faces of several adjacent packs. The conveyor belt is guided by two deflecting rollers and a supporting roller located between these two deflecting rollers. One deflecting roller is disposed slightly offset toward the outside. As a result, the conveyor belt approaches the pack string in the driving position at an acute angle relative to the transport direction, so that it adapts to the side faces of the packs.

When the conveyor belt is not driven, it is in a braking position by way of contacting a braking means. As a result, the packs of a row which lie ahead compared to other rows are braked until the packs are aligned with the packs of other rows.

An other advantageous effect of the invention results from using the conveyor belts as braking means for the pack string. If all conveyor belts are in the braking position, the foward portion of the pack string which is in the end position can be discharged correctly in the transverse direction. During the transverse displacement of the forward portion, several packs located behind one another are retained by the conveyor belts. Consequently, there is no need for an additional braking means.

Further features of the invention relate to the arrangement of the conveying means, to retaining means for the pack string and to the positioning of inspection means.

Figure 2:
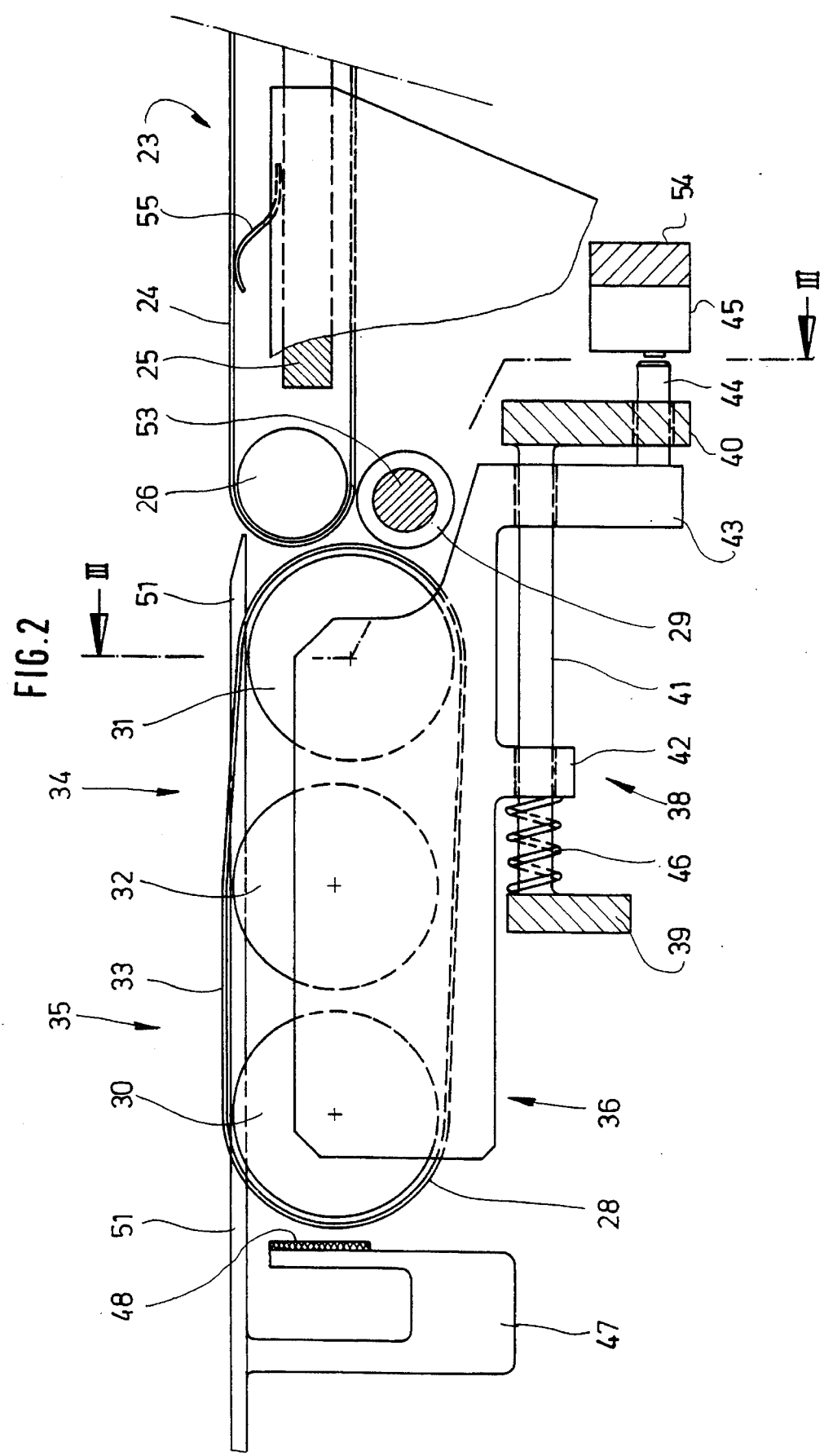
Figure 3:
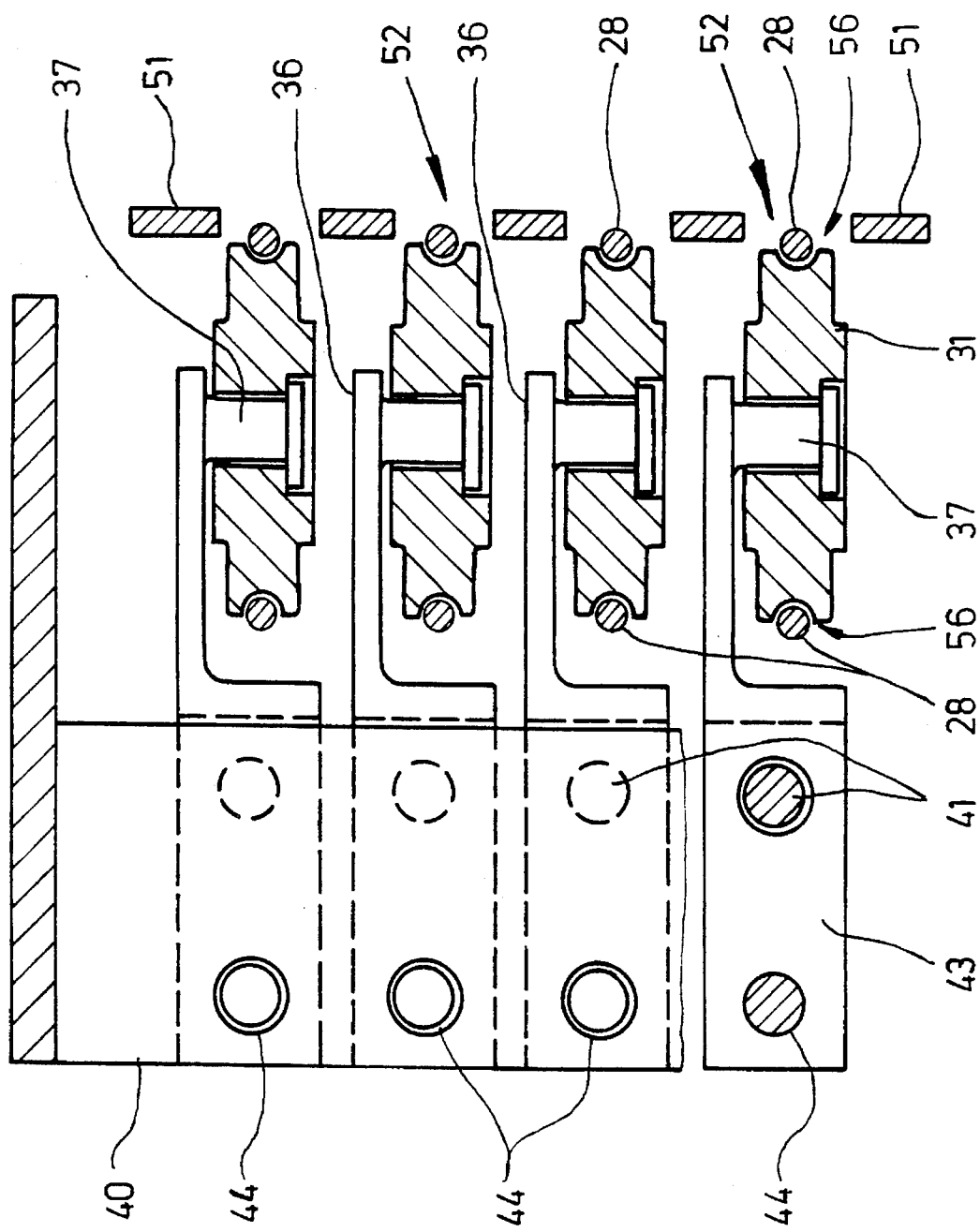

An exemplary embodiment of the invention will be described hereinafter, in detail, with reference to the drawings, in which:

FIG. 1 is a schematic plan view showing a portion of a transport system for packs, FIG. 2 is a fractional and partly sectional view of the apparatus of FIG. 1, on an enlarged scale, FIG. 3 shows a sectional view taken along line III—III of FIG. 2, FIG. 4 shows the arrangement of inspection means in a sectional view taken along line IV—IV of FIG 1.

The exemplary embodiment illustrated in the drawings is directed to the handling of cuboid packs 10, in particular sort packs for paper handkerchiefs. A group of folded paper handkerchiefs is wrapped in a thin film, thereby forming a pack 10. Thereafter, it is required to form a large pack, specifically a bundle, from a plurality of oriented packs 10, in particular from a pack group 11.

For this purpose, the packs 10 are fed to a station in the form of a pack string 12 in order to form the pack groups 11. The pack string 12 is comprised of several superposed rows, in this case four superposed rows 13, 14, 15 and 16. The packs 10 of these rows 13 . . 16 are aligned with one another, i.e. they rest precisely on top of one another.

To form the pack group 11, a respective portion of the pack string 12 which lies in front with respect to the direction of transport is discharged in the transverse direction, thereby forming the pack group 11. In the exemplary embodiment described above, the pack group 11 is discharged in the transverse direction on an arcuate group track 17 having lateral guides 18 and 19. For this purpose, a pusher 20 is mounted centrally relative to the group track 17 and rotates along a circular path. This pusher engages a front portion of the pack string 12 which is located in the region of the group track 17 and forms a pack group 11, and transports this pack group on the group track 17 to a packaging station (not shown). The pack group 11, which is formed originally from the front portion of the pack string 12, extends in the radial direction across the width of the group track 17, in particular between the guides 18, 19 of the group track.

The pack string 12 is delivered along a pack track 21 in the radial direction of the group track 17. The respective front packs 10 of the pack string 12 are conveyed against a stop, in the present case against the inward arcuate guide 18. When the pack string 12 contacts the guide 18, a front portion of the pack string 12 which corresponds to the pack group 11 is positioned in the region of the group track 17, in particular precisely between the guides 18 and 19. To ensure a correct transfer of the pack group 11, it is important that the packs 10 of the rows 13 . . 16 are located on top of one another accurately. This accurate position is imperative to ensure that the pack group 11 formed from the front portion of the pack string 12 is discharged and enters the region between the guides 18 and 19 without any malfunctions.

In the exemplary embodiment described, the pack track 21 comprises a support for the four superposed rows 13 . . 16 (not shown). This support is formed from an upper strand of a belt conveyor. This upper strand is guided on a carrier plate which is connected to a machine frame. The belt conveyor, that is to say its upper strand, is driven in the conveying direction.

Furthermore, the pack track 21 comprises laterally disposed conveyors, in particular side conveyors 22 and 23 which also take the form of belt conveyors. A conveying strand 24 which faces the pack string 12 extends preferably across the height of the pack string 12, so that all rows 13 . . 16 are engaged late rally so as to be conveyed. An upright supporting wall 25 extends between the strands in the region of each side conveyor 22, 23. This supporting wall 25 is connected to the carrier plate or another part of the machine frame. The side conveyors 22, 23 are guided about upright deflecting rollers 26 which may be driven.

The side conveyors 22, 23 and the belt conveyor define a conveying portion of the pack track 21 which ends at a distance from the group track 17. In the region between the group track 17 and the side conveyors 22, 23, the pack string 12 rests on a support (not shown) in a sliding manner.

In the region immediately adjoining the side conveyors 22, 23, the pack track 21 is equipped with additional conveying means which effect an adjustment of the rows 13 . . 16 when their packs 10 are offset to one another. A portion 27 of the pack track 21 in which there are no driving means is formed between these additional conveying means and the group track 17. The conveyance of the packs 10 in this portion 27 is a result of the thrusting motion of the packs 10 following from behind.

In the exemplary embodiment described, the additional conveying means take the form of conveyor belts 28 which are located on either side of the pack string 12. The conveyor belts 28 are assigned to each row 13 . . 16. Each conveyor belt 28 contacts a side face of the row 13 . . 16, that is to say a laterally directed end face of the packs 10. The conveyor belts 28 are arranged above one another and are made of an elastic material having an increased coefficient of friction.

The conveyor belts 28 are guided about deflecting rollers 30, 31 and a supporting roller 32 located between the defecting rollers. Each conveyor belt 28 has a conveying strand 33 which faces the pack string 12 and contacts several packs 10 of each row 13 . . 16 at the same time.

The conveyor belts 28 act on one or more of the rows 13 . . 16, when one row 13 . . 16 is offset relative to the other rows, namely when a row falls behind in the conveying direction. The respective row 13 . . 16 is conveyed (further) by the associated conveyor belts 28 until there is an accurate alignment with the packs 10 of the other rows 13 . . 16.

In terms of drive transmission, the conveyor belts 28 are connected to the side conveyors 22, 23. The driving motion is transmitted from the side conveyors 22, 23, that is to say from their deflecting rollers 26, to the conveyor belts 28 via intermediate rollers 29, Each conveyor belt 28 is associated with such an intermediate roller 29 which contacts, on the one hand, the side conveyor 22, 23 and, on the other hand, the conveyor belt 28. The driving force is transmitted frictionally.

FIG. 2 shows the arrangement of the conveyor belts 28 in the driving position. After the packs 10 have left the conveying portion defined by the side conveyors 22, 23, they enter an entry portion 34 of the conveyor belts 28. The conveying strands 33 of the conveyor belts 28 gradually approach the end faces of the packs 10, in particular at an acute angle relative to the direction of transport. This is a result of an offset arrangement of the deflecting rollers 31 which are disposed rearwardly with respect to the transport direction, such that the deflecting rollers 31 and the conveyor belts 28 they guide are located outside the pack track 21. In a further conveying portion 35 which follows, the conveying strands 33 contact the end faces of the rows 13 . . 16 and extend parallel to the transport direction. For this purpose, the deflecting rollers 30 and the supporting rollers 32 are arranged in one plane parallel to the transport direction.

The deflecting rollers 30, 31 and supporting rollers 32 which are assigned to one conveyor belt 28 are connected to a carrier plate 36. The rollers 30, 31, 32 are mounted rotation ally on axle journals 37 of the carrier plate 36. The carrier plate 36 is attached to a side carrier 38 which is formed from, on the one hand, upright parallel supporting walls 39, 40 and, on the other hand, a connecting rod 41 which connects these supporting walls 39, 40 and is disposed parallel to the direction of transport. In order to be attached to the side carrier 38, the carrier plate 36 has a retaining lug 42 and a bracket 43 which have bores for a shiftable mounting on the connecting rod 41 of the side carrier 38. A push rod 44 is attached to the bracket 43. This push rod 44 is passed through a bore of the supporting wall 40 which is directed towards the side conveyors 22, 23 and is shiftably mounted therein. The push rod 44 is mounted shiftably in the longitudinal direction, i.e. In the conveying direction. In order to displace the conveyor belt 28 so as to lift if off the intermediate roller 29, a pressure medium cylinder 45 with a piston rod acts upon the free end of the push rod 44. Together with the push rod 44, the holding plate 36 is moved along the connecting rod 41 of the side carrier 38 and the conveyor belt 28 is moved out of the driving position.

A compression spring 46 is disposed on the connecting rod 41 in the region between the forward supporting wall 39 with respect to the conveying direction and the retaining lug 42 of the carrier plate 35. This compression spring 46 is compressed and, when the piston rod of the pressure medium cylinder 45 is retracted, effects an automatic return of the push rod 44 into the initial position shown in FIG. 2 in which the conveyor belts 28 contact the intermediate roller 29.

In the position (not shown) in which the conveyor belts 28 are lifted off the intermediate roller 29, the conveyor belts are braked. For this purpose, a braking means, in particular a braking leg 47 with a braking surface 48, is disposed in the region of the deflecting roller 30. In the braking position, the conveyor belt 28 which rests on the deflecting roller 30 is pressed against the braking surface 48. The braking surface is made of a material with an increased coefficient of friction.

The separate drive for the individual rows 13 . . 16, which drive takes the form of the conveyor belts 28, is in this case designed such that the row 13 . . 16 which is behind with respect to the conveying direction is moved further by the associated conveyor belt 28, whereas the other rows 13 . . 16 are braked as a result of the appropriate position of the conveyor belts 28.

The mode of operation of the apparatus is as follows: The formation of the pack string 12 is inspected in the end region of the pack track 21 by inspection means. In the illustrated exemplary embodiment, the end of the pack string 12 which is located in front with respect to the conveying direction is inspected. For this purpose, inspection means, in particular optoelectric sensors 49, are disposed in the region of the stop for the pack string 12, i.e. at the inner guide 18. Each row 13 . . 16 is associated with a sensor 49 having transmitter and a receiver. The guide 18 is provided with a cutout 50 in the region of the sensors 49.

The end of the pack string 12 which is in front after the transfer of a pack group 11 is inspected by the sensors 49 while it travels forward and up against the guide 18. The respective sensor 49 initiates the compensating conveyance if it identifies an undesired relative position which results from one (or more) row 13 . . 16 being offset rearwardly with respect to the conveying direction. The rows 13 . . 16 which are correct with respect to their relative position continue until they come up against the stop (guide 18). As a result, the respective rows 13 . . 16 come to a standstill. The conveyor belts 28 which are associated with these rows 13 . . 16 are switched into braking position in the described manner, i.e. they are lifted off from the driving connection with the side conveyors 22, 23. The row 13 . . 16 which lies behind is transported further by the associated conveyor belt 28 which remains linked to the side conveyors 22, 23 and is thus driven. The drive of this row 13 . . 16 is continued until the foremost pack 10 of time row 13 . . 16 with respect to the conveying direction contacts the guide 18 as well. As a result, all rows 13 . . 16 are aligned. Now, the conveyor belt 28 which is associated with the row which was lying behind is moved into the braking position as well.

After the correct end position has been reached, the conveyor belts 28 of each row 13 . . 16 are in the braking position. The length of the conveyor belts 28 is such that, on either side of the pack string 12, they contact with their conveying strands 33 the end faces of several packs 10 located behind one another. This results in a sufficient braking effect which permits the front portion of the pack string 12, namely the pack group 11, to be engaged by the pusher 20 and to be displaced transversely on the group track 17. An additional braking means for temporarily retaining the pack string 12 is not required, because the pack string 12 is sufficiently fixed in the braking position by the conveyor belts 28.

Additional guide mean in the form of lateral guides 51 are disposed in the region between the side conveyors 22, 23 and the outer guide 19 at the sides of the pack string 12. This lateral guide has slits 52 in the region of the conveyor belts 28. The conveying strands 33 of the conveyor belts 28 pass through these slits in order to contact the end faces of the packs 10. In the region which immediately follows the conveying portion 35 in the transport direction, the lateral guides 51 a reconnected to the braking legs 47 which are associated with each conveyor belt 28. The lateral guides 51 preferably extend into the region of the outer guide 19. As a result, it is prevented that the pack string 12 which follows the pack group 11 is displaced transversely during the discharge of the pack group 11.

After the pack group 11 has been pushed off, the conveyor belts 28 return to the driving position shown in FIG. 2. The advance of the pack string 12 is restarted by the continuously running side conveyors 22, 23 and the conveyor belts 28 which are located in the driving position.

The additional conveying means—conveyor belts 28—which are to compensate differences in the position of the rows 13 . . 16, are arranged in this embodiment in such a way that an additional conveyance takes place only in the region of that part of the pack string 12 which is already located outside the side conveyors 22, 23. Accordingly, the conveyor belts 28 act in a region of free conveyance of the pack string 12.

In the described exemplary embodiment, the intermediate rollers 29 which transmit the drive from the side conveyors 22, 23 to the conveyor belts 28 are arranged on a common rotatingly mounted upright supporting axle 53 or are a part thereof. As a result, the conveyor belts 28 which are located in the conveying position (FIG. 2) are always driven roger her and at the same rotational speed. As a result of the axial displacement of the push rod 44 and the carrier plate 36, the convey or belts 28 are moved out of the driving position, in particular into the braking position in which they contact the braking surface 48 which acts as a braking means. The conveyor belts 28 remain with their conveying strands 33 in the position in which they contact the packs 10 of the rows 13 . . 16.

The pressure medium cylinder 45 is connected to a supporting device via a base 54. The supporting walls 39, 40 of the side carriers 38 are also attached to this supporting device.

In order to en sure a correct guidance of the pack string 12, the conveying strand 24 of the side conveyors 22, 23 is resiliently subjected to pressure in the direction against the end faces of the packs 10. For this purpose, pressure springs 55 which have an approximately S-shaped design are attached to the supporting wall 25. The pressure springs 55 rest against the conveying strand 24 with a rounded leg. Moreover, the conveyor belts 28 have a round cross section and enter corresponding semi-circular grooves 56 of the deflecting rollers 30, 31 and supporting rollers 32.

We claim:

1. An apparatus for transporting in a forward conveying direction a string (12) of packs, which is formed from a plurality of rows (13, 14, 15, 16) of packs (10), and for forming groups (11) of packs by pushing off the groups transversely to the string (12), said apparatus having two endless side conveyors (22, 23) disposed on opposite sides of the string (12) for applying a first conveying drive to the packs in the forward conveying direction, wherein said apparatus further comprises:

a) inspection means (49) for inspecting the relative position of the rows (13 . . 16) that are disposed adjacent to one another, and for producing control signals indicative of said relative position; and b) a plurality of individual conveying mean (28) respectively assigned to the plurality of rows (13 . . 16), wherein, c) for a given row (13..16) that lags behind others of said rows relative to the conveying direction, and in response to said control signals from said inspection means (49), each of said individual conveying means applies an additional conveying drive to the given row (13..16) until the rows are aligned relative to one another;

wherein said individual conveying means are individually movable into and out of a driving position in response to the control signals produced by the inspection means (49);

wherein said plurality of individual conveying means comprises a plurality of conveyor belts (28);

wherein the rows (13..16) are arranged on top of one another; and wherein at least one of said conveyor belts (28) is associated with each row, and, in the driving position, is connected to the side conveyors (22, 23) by a drive transmission comprising an intermediate roller (29) which is frictionally engaged both with one of said side conveyors (22, 23) and also with an associated one of the conveyor belts (28).

2. The apparatus as claimed in claim 1, wherein said side conveyors (22, 23) have deflecting rollers (26), wherein the conveyor belts (28) for the rows (13..16) are disposed ahead, in the conveying direction, of the deflecting rollers (26) of the side conveyors (22, 23), and wherein the conveyor belts (28) are connected to the side conveyors (22, 23) by the drive transmission at the deflecting rollers (26).

3. An apparatus for transporting in a forward conveying direction a string (12) of packs, which is formed from a plurality of rows (13, 14, 15, 16) of packs (10), and for forming groups (11) of packs by pushing off the groups transversely to the string (12), said apparatus having two endless side conveyors (22, 23) disposed on opposite sides of the string (12) for applying a first conveying drive to the packs in the forward conveying direction, wherein said apparatus further comprises:

a) inspection means (49) for inspecting the relative position of the rows (13..16) that are disposed adjacent to one another, and for producing control signals indicative of said relative position; and b) a plurality of individual conveying means (28) respectively assigned to the plurality of rows (13..16), wherein, c) for a given row (13..16) that lags behind others of said rows relative to the conveying direction, and in response to said control signals from said inspection means (49), each of said individual conveying means applies an additional conveying drive to the given row (13..16) until the rows are aligned relative to one another;

wherein said individual conveying means are individually movable into and out of a driving position in response to the control signals produced by the inspection means (49);

wherein said plurality of conveying means comprises a plurality of conveyor belts 28, and wherein the conveyor belts (28) have conveying strands (33) which are driven in the conveying direction and which contact several packs (10) of one row (13..16) and apply said additional conveying drive to the packs (10) in the driving position.

4. The apparatus as claimed in claim 3, wherein said conveyor belts (28) have first deflecting rollers (31) which are disposed in such a way that the conveying strands (33) approach their associated rows (13..16) in an entry portion (34) at an acute angle to the conveying direction until said conveying strands contact the associated rows.

5. The apparatus as claimed in claim 4, wherein said conveyor belts (28) further have, in a conveying portion (35) which adjoins said entry portion (34), second deflecting rollers (30) and supporting rollers (32), which are disposed in such a way that the conveying strands (33) fully contact the packs (10) of said associated rows (13..16) and drive the packs in the conveying direction.

6. The apparatus as claimed in claim 3, further comprising lateral guides (51), for guiding the string (12), which adjoin the side conveyors (22, 23) and have slits (52) in a region of the conveyor belts (28) so as to permit the conveying strands (33) to pass through the slits and to contact the rows (13..16) of the pack string (12).

7. The apparatus as claimed in claim 5, wherein the conveyor belts (28) have a round cross section, and are disposed in corresponding grooves (56) of the deflecting rollers (30, 31) and the supporting rollers (32).

8. An apparatus for transporting in a forward conveying direction a string (12) of packs, which is formed from a plurality of rows (13, 14, 15, 16) of packs (10), and for forming groups (11) of packs by pushing off the groups transversely to the string (12), said apparatus having two endless side conveyors (22, 23) disposed on opposite sides of the string (12) for applying a first conveying drive to the packs in the forward conveying direction, wherein said apparatus further comprises:

a) inspection means (49) for inspecting the relative position of the rows (13..16) that are disposed adjacent to one another, and for producing control signals indicative of said relative position; and b) a plurality of individual conveying means (28) respectively assigned to the plurality of rows (13..16), wherein, c) for a given row (13..16) that lags behind others of said rows relative to the conveying direction, and in response to said control signals from said inspection means (49), each of said individual conveying means applies an additional conveying drive to the given row (13..16) until the rows are aligned relative to one another:

wherein said individual conveying means are individually movable into and out of a driving position in response to the control signals produced by the inspection means (49);

wherein said plurality of conveying means comprises a plurality of conveyor belts (28), and further comprising braking means, wherein the conveyor belts (28), while being non-driven and still contacting packs (10), are braked and stopped by said braking means in order to temporarily stop transport of the pack string (12).

9. The apparatus as claimed in claim 8, further comprising a transversely, relative to said conveying direction, directed track (17) for transporting groups of packs, said track having a transversely directed arcuate guide (18), wherein, in order to form the groups (11) of packs, the string (12) is conveyed against said guide (18), and wherein the conveyor belts (28) are movable out of the driving position and into a braking position for the rows which run up against said guide (18), and remain in the driving position for the rows which lie behind other rows in the conveying direction.

10. In an apparatus for conveying in a forward conveying direction a string (12) of packs which is formed from a plurality of rows (13, 14, 15, 16) of packs disposed above one another, the packs (10) being conveyed in a closely packed position and being aligned from row to row, and for forming pack groups (11) by pushing off the pack groups transversely to said conveying direction of the pack string (12), said apparatus having two side conveyors (22, 23), disposed in regions on opposite sides of the pack string, for applying a first conveying drive to the pack string (12) in said conveying direction, the improvement wherein:

a) at least one sensor (49) is assigned to each row (13, 14, 15, 16) and generates a control signal indicative of the relative position of said each row relative to the other rows;

b) two conveyor belts (28) are respectively assigned to, and disposed on opposite sides of, each row (13 to 16);

c) said conveyor belts (28) are located outside of said regions of said side conveyors (22, 23); and d) the conveyor belts (28) are controlled by said control signal generated by said sensor (49) such that, if one row (13 to 16) lags behind the other rows with respect to said conveying direction, the conveyor belts (28) assigned to said one row apply an additional conveying drive to said one row until there is attained an alignment of the packs (10) of said one row with the packs of the other rows.

* * * * *